June 22, 1937. F. SCHORI Re. 20,425

ATOMIZER FOR MATERIALS IN POWDER FORM

Original Filed Jan. 6, 1927 2 Sheets-Sheet 1

Fritz Schori
INVENTOR

BY Jeffery Kinnear Eggleston
ATTORNEYS

June 22, 1937. F. SCHORI Re. 20,425

ATOMIZER FOR MATERIALS IN POWDER FORM

Original Filed Jan. 6, 1927 2 Sheets-Sheet 2

Fritz Schori
INVENTOR

BY Kenyon & Kenyon
ATTORNEYS

Reissued June 22, 1937

Re. 20,425

UNITED STATES PATENT OFFICE 20,425

ATOMIZER FOR MATERIALS IN POWDER FORM

Fritz Schori, Wetzikon, Switzerland

Original No. 1,781,603, dated November 11, 1930, Serial No. 159,490, January 6, 1927. Application for reissue March 23, 1935, Serial No. 12,700. In Switzerland October 5, 1926

8 Claims. (Cl. 91—12.2)

The invention relates to atomizers for material in powder form and more particularly to apparatus for spray-coating surfaces with metallic or fusible material supplied as powder and atomized in a spray of flame by which it is melted and projected onto the surface to be coated. It consists in a special manner of feeding the powder to the flame of the atomizer to keep its rate of supply steadily constant with the generation of heat by the flame, thereby giving superior coating results at enhanced speed. To this end the invention consists in causing the flow of one of the fluid components of the spray or flame, in passing through the atomizer device or pistol, to generate a suction effect therein, and in utilizing such suction to produce an air current flowing through a suitable feed conduit from the powder-containing receptacle to the pistol, the air to form such current being sucked into the suction conduit through an entrance hole or holes located adjacent to the receptacle but outside of the mass of powder therein, so that the air current flows to the pistol at a rate which is constant, being determined solely by the suction and the size of the air entrance, and is independent of and unaffected by the amount of powder that may be present in the receptacle and does not affect that powder as by depositing moisture of condensation thereon, which would tend to make it lumpy. Into this air current the powder is delivered from the receptacle by its own gravity, assisted by mechanical means if necessary, through a passage of predetermined but adjustable caliber and enters only as permitted by that caliber and at a constant rate. The effect of the steady delivery of powder to the steady current of conveying air is to feed the powder to the atomizer at a rate which is also steady and always constant to the rate of flow to the pistol of the combustion re-agents and hence to the heat generated. Thereby overheating and vaporization of the powder is prevented on the one hand and underheating and insufficient fusion of it, on the other. Such balance of powder feed and heat continues permanently after an initial adjustment because the air in the suction conduit is constant with the steady flame and the powder feed is also constant, being under the force of gravity, as stated.

The invention further includes a screen guard against the passage of oversized particles to the conveying air current and also a shaking means which forestalls bridging or clogging at or above the powder discharge outlet and assists and promotes the screening action.

Constructional examples of the subject matter of the present invention are illustrated on the accompanying drawings, in which.

Figure 4:
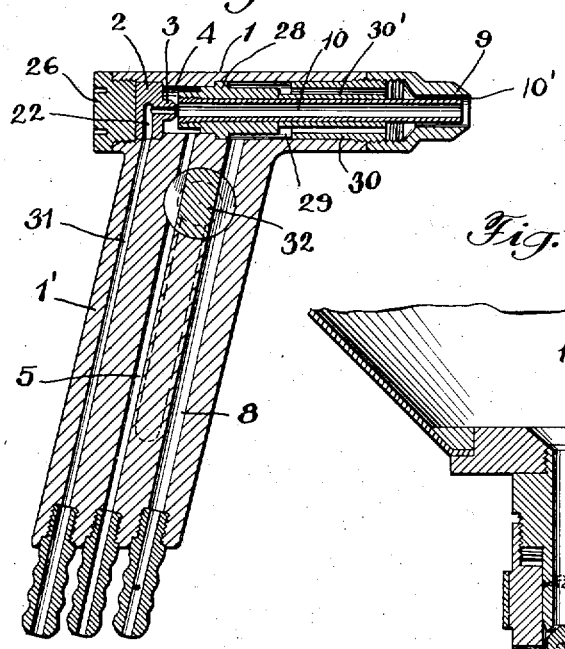
Fig. 4 shows the pistol in a vertical section and Fig. 5 is a modification of the lower part of the receptacle.

In the casing 1 of the hand-apparatus (Fig. 4) having a handle 1' a piece 2 is inserted provided with a channel 22 and an extension, the latter together with the wall of the casing forms a nozzle and is secured in position by a screw plug 26. The nozzle is provided with an annular space 4 which by an annular gap at the free end of the extension 3 is in connection with an atomizing chamber 10 formed by the interior of a tube 10'. The latter is screwed into a sleeve 28, which serves for partly defining the annular space 4 as well as a space 29 present in the casing 1. Further a sleeve 30 is screwed into the casing, said sleeve secures in its position by means of an extension the sleeve 28 and is provided with concentric channels 30'. To the inserted sleeve 30 the nozzle 9 of the burner is screwed. A channel 8 is provided in the handle 1' and leads to the space 29 of the casing 1, a channel 5 in the handle is in communication with the space 4 and a channel 31 communicates with the channel 22 of the insertion piece 2. A cock 32 controls the flow through the channels 5 and 8 of the handle and an arm 32' serves for adjusting the cock.

Figure 1:
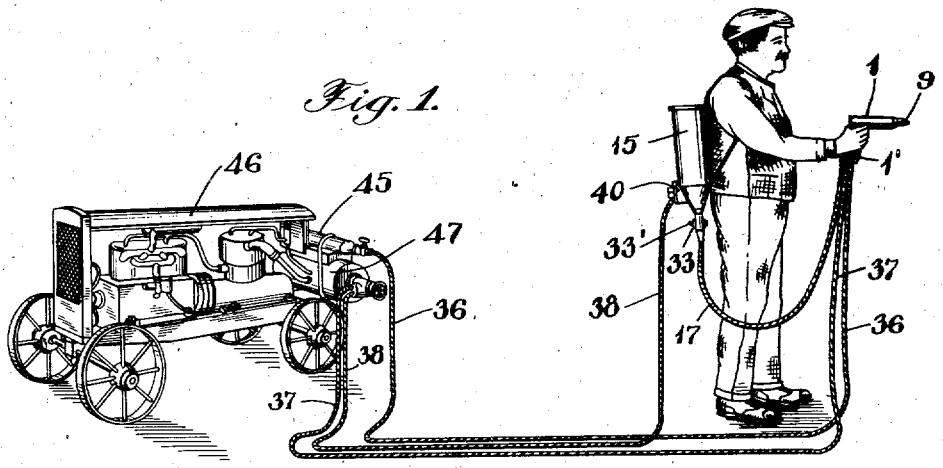
Fig. 1 shows the complete arrangement used by an operator for metal coating.
Figure 2:
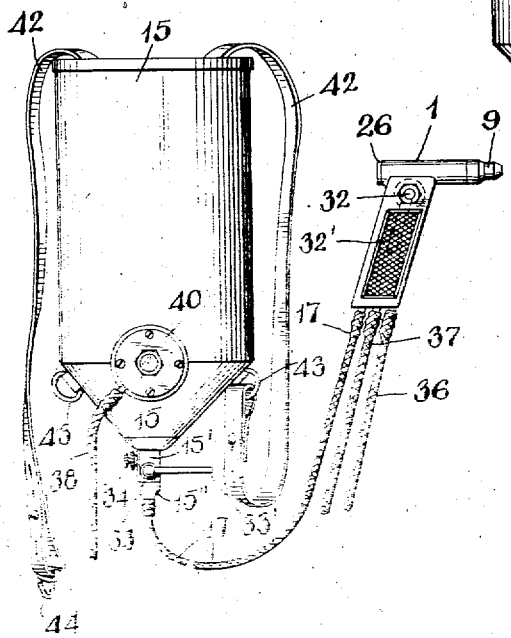
Fig. 2 shows the two prominent parts of the apparatus, i. e. the receptacle and the hand apparatus in elevation.

The channel 31 of the handle 1' is connected by means of a hose 17 forming the suction conduit to a receptacle 15 containing the metal in powder form, the lower end of the receptacle tapers and is provided with a connecting branch 15'. The latter is provided with a cock 33 and with an adjusting screw 34 adapted to control the cross-sectional area of the channel provided in the branch 15'. Inside the receptacle 15 a cylindrical sieve 35 is placed above the bore of the branch 15', the perforations of the sieve permitting the metallic powder to pass through them. To the channel 8 of the handle 1' a hose 36 is connected serving to supply a combustible gas for instance from a gas bottle 45 carried on a portable air compressor plant 46 (Fig. 1). A hose 37 connected to the channel 5 of the handle 1' serves to supply a pressure medium, for instance compressed air supplied from a container 47 of the compressor plant 46 (Fig. 1). By means of a further hose designated 38 compressed air (for instance from the container 47 Fig. 1), is led by a branch 39 into a casing 40 provided on the receptacle 15, in which casing a wheel 41 provided with recesses on its circumference to act as blades is arranged. To the top wall, which is fixed to the receptacle 15 and provided with a closable opening for filling in the metallic powder, two shoulder straps 42 are connected. Rings 43 provided on the receptacle serve for fixing the straps 42 the length of which is adjustable (by means of a button and slots); one of the straps is threaded through one of the rings and the other is provided with a hook 44 adapted to cooperate with the second ring. The receptacle 15 may be conveniently carried on the back of the operator, the two straps 42 passing over his shoulders.

In using the atomizer the current of compressed air from the hose 37 flows through the channel 5 of the handle 1' of the hand-apparatus to the annular space 4 and through the gap between the extensions 3 and the parts 16' and 28 into the chamber 10 and then into the open. The passage of the current of compressed air through the gap causes a continuous suction action which is transmitted by the channels 22 and 31, the hose 17 and the branch 15' to the lower end of the receptacle 15, whereby metallic powder is continuously conveyed by suction action through 15', 17, 31, 22. Air entrance holes 15'' provided in the branch 15' permit the access of atmospheric air into the suction conduit. The jet of powderous material issuing from the channel 22 is very finely atomized inside the chamber 10 by the annular current of compressed air intersecting the former jet at an acute angle. The atomized powder gets then into the melting flame issuing from the burner nozzle 9 and is projected against the facing to be coated. The melting flame is fed with the gas supplied to the nozzle by the hose 36 and flowing through the channel 8, the space 29 and the channels 30' of the inserted sleeve 30. By means of the compressed air flowing through the hose 38 into the casing 40 on the receptacle 15 and out of the casing by the exit opening 40' the turbine wheel 41 is caused to rotate whereby a certain vibration of the receptacle is effected; the vibrating or shaking action on the receptacle 15 is further increased in that the mass of the turbine wheel 41 is not balanced, holes 41' being provided in one-half of the wheel. On account of this shaking effect on the receptacle 15 the formation of a compact column of powder, which is apt to take place when very fine and somewhat moist powder is contained in larger quantities in the receptacle, is prevented. By means of the cock 32 arranged in the handle 1' of the hand-apparatus the current of the compressed air and of the combustible gas may be throttled or completely cut off. By turning the handle 33' of the cock 33 provided in the branch 15' of the receptacle 15 the stream of metallic powder may be cut off.

Figure 3:
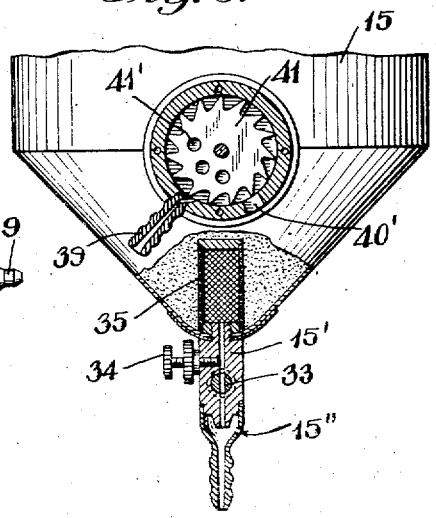
Fig. 3 shows the lower portion of receptacle in elevation and with parts shown in section.
Figure 5:
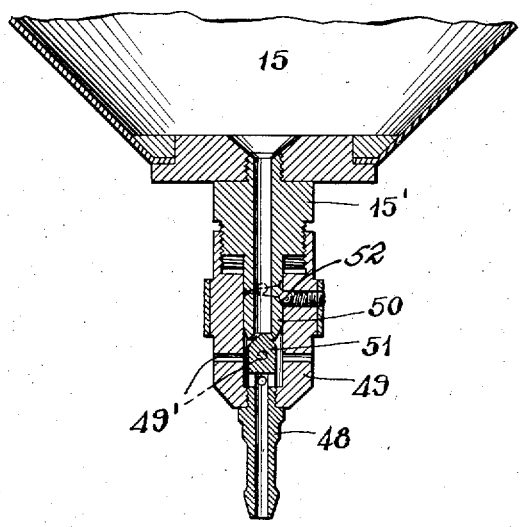

Fig. 5 shows a modified construction of the discharge branch 15' provided on the receptacle 15 which differs from that shown in Fig. 3 in that instead of the cock 33 and the regulating screws 34 an adjustable nozzle is provided for influencing the discharge of the metallic powder. The nipple 48, to which the hose 17 is to be connected is screwed to a member 49 which in its turn is connected by screw thread to the branch 15'. The latter is provided with a tubular extension 50 the end of which forms in cooperation with the conical end face of an extension 51 of the nipple 48 a nozzle. By turning the member 49 against the branch 15' the extension 51 is axially displaced against the end of the extension 50 whereby the cross-sectional area of the nozzle may be regulated or cut off if desired. A spring loaded ball 52 mounted in the member 49 is adapted to cooperate with recesses arranged in the extension 50 to secure the elements 49 and 15' in their adjusted positions. Openings 49' are provided to admit atmospheric air to the suction conduit below the valve formed by 50 and 51, as in Fig. 5.

Obviously the above described examples of the atomizers make it possible to have a good stock of the material to be atomized at the working place without increasing the load on the hand of the operator handling the pistol so that the free movability of the operator is ensured.

The above described atomizer may also be used for atomizing and producing a coat of non-metallic materials in powder form.

I claim:

1. An arrangement for atomizing materials and particularly materials in powder form, comprising in combination, a portable receptacle adapted to take up a stock of the material to be atomized, a flame-spraying hand-apparatus containing fuel-feeding means and a nozzle, means to supply a medium under pressure to said nozzle of the hand-apparatus whereby a suction action is generated, conduit means connecting the lower end of said receptacle to said hand-apparatus for conveying the material to be atomized from said receptacle to said hand-apparatus by the suction action of said nozzle by which it is atomized by the same pressure medium which generates the suction, a casing attached to said receptacle, a turbine wheel enclosed in and rotatably mounted in said casing, and means to supply a pressure medium to said casing for causing a rotation of said turbine wheel and to impart thereby vibrations to said receptacle in order to prevent clogging of the material to be atomized.

2. In a spraying apparatus, a flame-spraying device comprising a casing, a nozzle therein, means to supply suspended metal to said casing, a tube in alinement with and spaced from said nozzle to form a suction chamber therebetween, said tube extending substantially to the outer end of said casing, means to supply atomizing air to the chamber and tube for combustion, a sleeve surrounding said tube and having longitudinal passages therein concentric with said tube, means to supply a combustible gas to said passages, said gas being discharged between the tube and casing and being burnt at the outer end of the casing in contact with the atomizing air, said means to supply suspended metal including an air hose connected to said suction chamber, and means to continually shake the receptacle during operation.

3. Coating apparatus comprising a hand spraying device or pistol containing fluid passages for conducting and spraying a plurality of fluids, one of said fluids being a fuel suited to form a flame and one of said fluids carrying suspended therein a fusible powder to be melted by said flame to form the coating, a suction producing device in said pistol comprising a chamber in one of said fluid passages wherein the velocity of the fluid produces a suction effect, and a receptacle for containing a body of such powder, in combination with means for transporting the powder from the receptacle to the pistol comprising a suction conduit, said conduit excluding said receptacle and being subject at one end to the suction effect of said suction-producing device in the pistol and having at its other end an entrance removed from said body of powder, through which and said conduit a conveying gaseous current is maintained by the suction unaffected by and not affecting the body of powder in the receptacle, and means for discharging the powder at a constant rate from said body into said current, whereby said powder is conveyed to the pistol at a rate constant with the combustion of said flame.

4. Coating apparatus comprising a hand spraying device or pistol containing fluid passages for conducting and spraying a plurality of fluids, one of said fluids being fuel gas adapted to form a flame and one of said fluids carrying suspended therein a fusible powder suited to be melted by such flame to form the coating, a suction-producing device in said pistol comprising a chamber in one of said fluid passages wherein the velocity of the fluid produces a suction effect, and a receptacle for containing a body of such powder, in combination with means for feeding the powder from the receptacle to the pistol comprising a suction conduit said conduit excluding said receptacle and being subject at one end to the suction effect of said device in the pistol and having at its other end an entrance removed from said body of powder, through which and said conduit a conveying gaseous current is maintained by suction unaffected by and not affecting the body of the powder in the receptacle, means for discharging the powder at a non-fluctuating rate from said body into said conveying current, and means for conforming said rate to the rate of flow of fuel gas to said flame.

5. Coating apparatus comprising a hand spraying device or pistol containing fluid passages for conducting and spraying a plurality of fluids, one of said fluids being a fuel gas adapted to form a flame and one of said fluids carrying suspended therein a fusible powder suited to be melted by the flame to form the coating, a suction-producing device in said pistol comprising a chamber in one of said fluid passages wherein the velocity of the fluid produces a suction effect, and a receptacle for containing a body of such powder, in combination with means for feeding the powder from the receptacle to the pistol comprising a suction conduit, said conduit excluding said receptacle and being subject at one end to the suction effect of said device in the pistol and having at its other end an entrance removed from said body of powder through which and said conduit a conveying gaseous current is maintained by suction in said conduit unaffected by and not affecting the body of the powder in the receptacle, a gravity discharge passage from the receptacle to said conveying current, and means for agitating the powder entering said passage.

6. Coating apparatus comprising a hand spraying device or pistol containing fluid passages adapted to conduct and spray a plurality of fluids, one of which is a fuel gas to form a flame and one of which carries suspended therein a fusible powder suited to be melted by such flame to form the coating, one of said passages including a device whereby the fluid velocity creates a suction effect, and a receptacle for containing a supply of such powder, in combination with means for feeding the powder from the receptacle to the pistol comprising a suction conduit, said conduit excluding said receptacle and being subject at one end to the suction effect of said device in the pistol and having at its other end an entrance removed from said powder through which and said conduit a conveying gaseous current is maintained unaffected by and not affecting the body of the powder in the receptacle, and a passage for conducting the powder at a constant rate from said receptacle into said conveying current, a powder screen associated with said passage and means for shaking said screen and passage.

7. Coating apparatus comprising in combination, a hand flame-spraying device or pistol, flexible tubes supplying the same with air and with fuel gas suited to form the flame, an air passage in said piston including a suction-producing device comprising a chamber in which the air flow produces a suction effect, a receptacle for containing a supply of a fusible powder suitable to form a coating, and means for feeding such powder from the receptacle to the pistol comprising a hose connected to the pistol at one end and subject to the suction effect of said device in the pistol and connected at its other end with the bottom of said receptacle, an air entrance at the latter end of said hose removed from said supply of powder whereby a conveying air current is maintained by the suction, the path of said current being exclusive of the mass of the powder in the receptacle, a gravity discharge passage leading from said receptacle to the path of said conveying current, and a valve for said passage to control the rate of powder flow therethrough.

8. Coating apparatus comprising in combination a hand flame-spraying device or pistol, flexible tubes supplying the same with air and fuel under pressure, an atomizing tube in said piston to deliver the air, a passage surrounding said tube to deliver the fuel, means for simultaneously controlling the flows through said tube and fuel passage, a receptacle for containing a supply of a fusible powder suitable to form a coating, and means for feeding such powder from the receptacle to the pistol comprising a hose connected to the pistol at one end and subject to suction induced in said atomizing tube by the air flow thereinto, and connected at its other end with said receptacle, an air entrance at the latter end of said hose removed from said supply of powder whereby a gaseous conveying current is maintained in said hose flowing into said atomizing tube the path of said air current excluding the interior of said receptacle, and a gravity discharge passage leading from said receptacle to the path of said conveying current, said powder being projected from said tube surrounded by the burning fuel projected from said fuel passage.

FRITZ SCHORI.